Dec. 20, 1966 H. B. RICE 3,292,772
CONVEYOR STRUCTURE
Filed Jan. 26, 1965 3 Sheets-Sheet 2
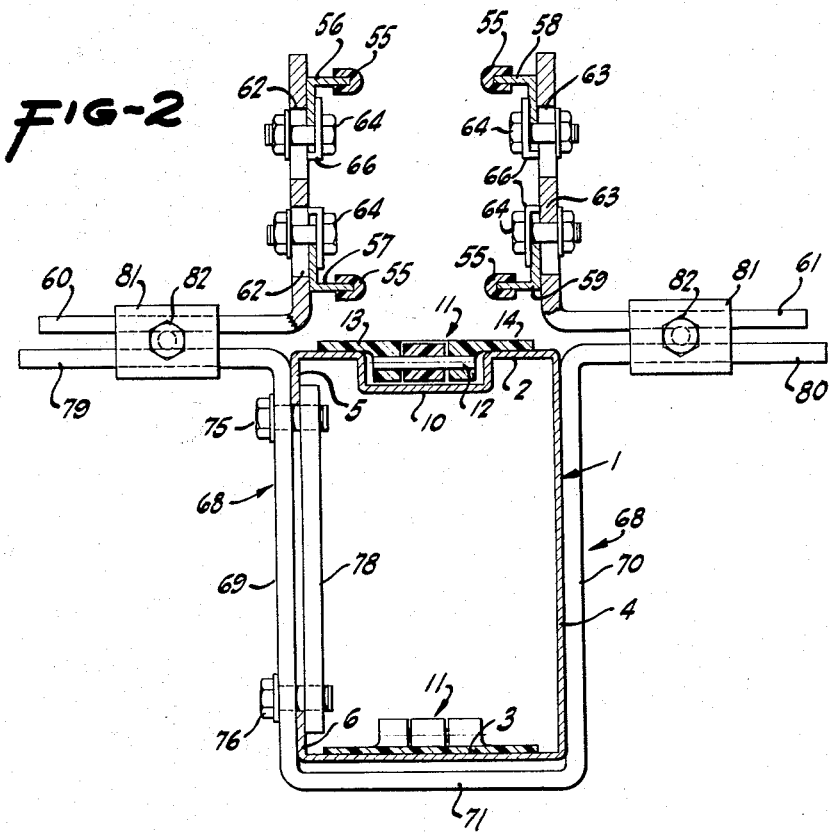
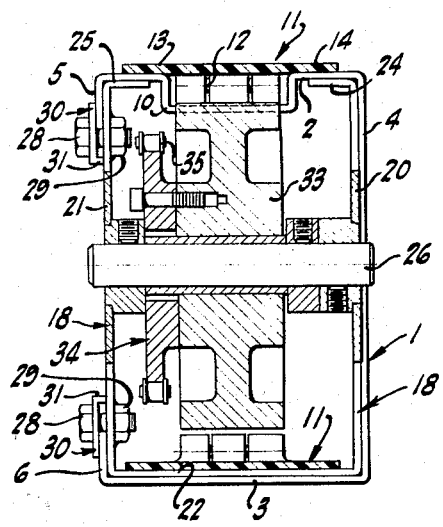
INVENTOR.
HAROLD B. RICE
BY Gordon Wood.
ATTORNEY

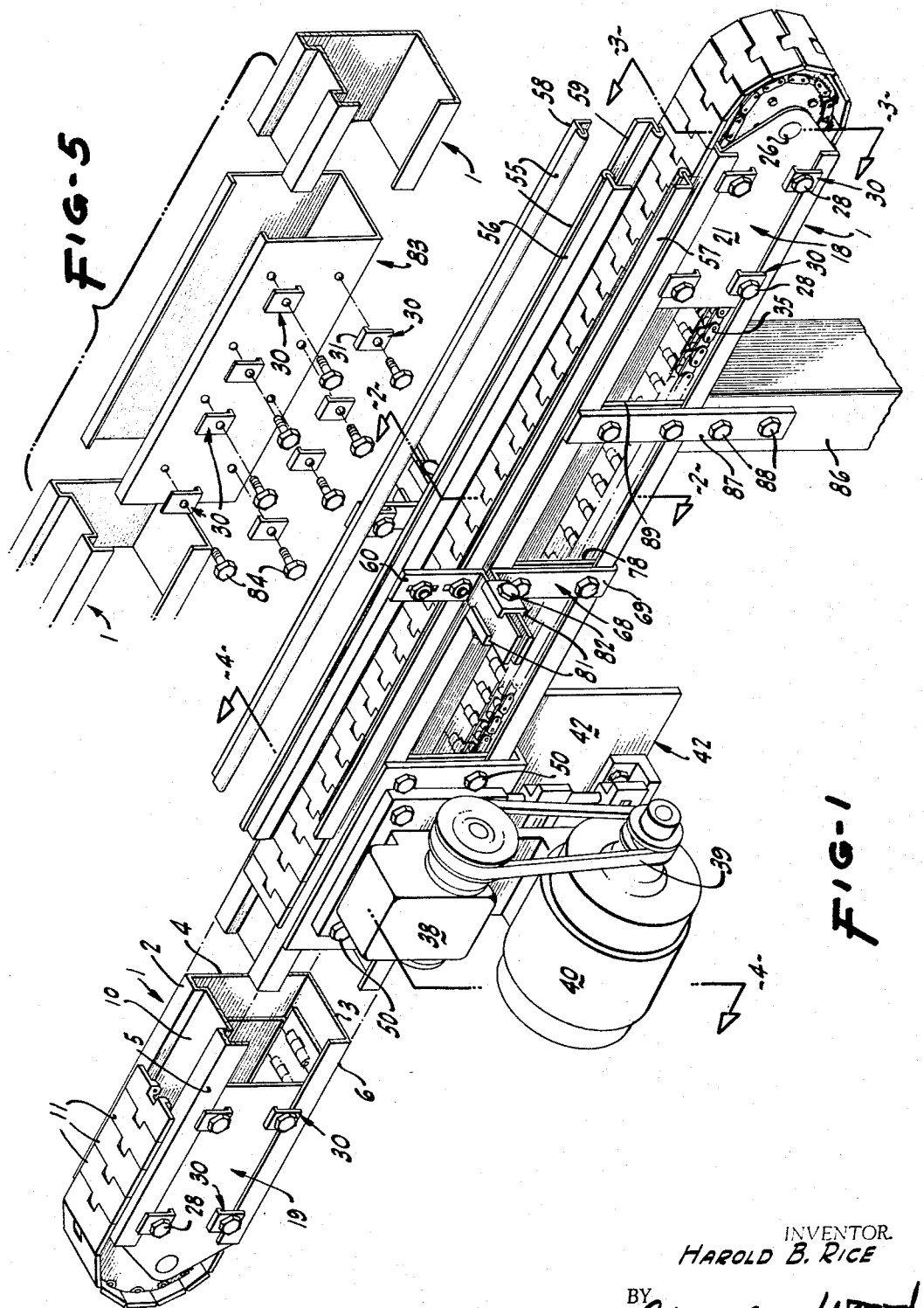

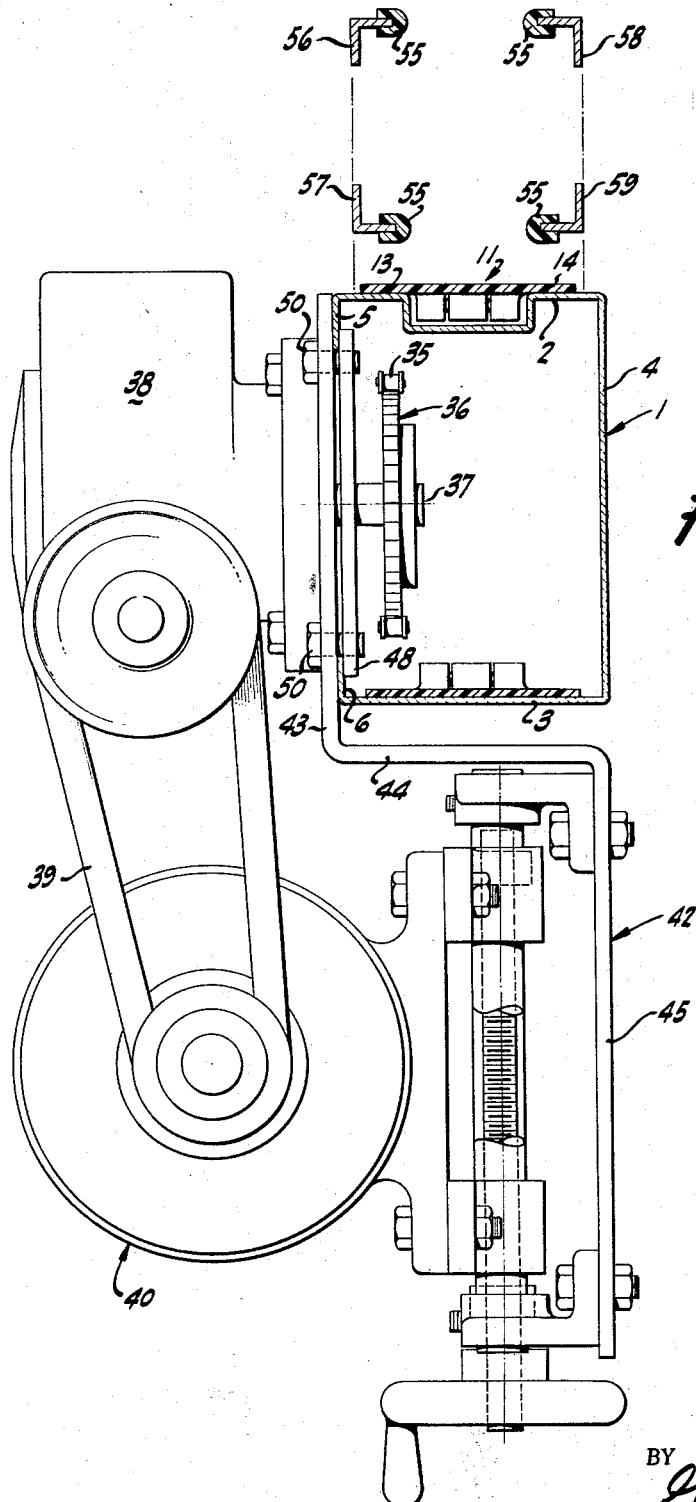

United States Patent Office 3,292,772
Patented Dec. 20, 1966

3,292,772
CONVEYOR STRUCTURE
Harold B. Rice, Walnut Creek, Calif., assignor to John Burton Machine Corporation, Concord, Calif.
Filed Jan. 26, 1965, Ser. No. 428,082
8 Claims. (Cl. 198—204)

This invention relates to conveyor structures and more particularly to the housing which supports the conveyor chain or other elongated article carrying element.

In recent years there have been many improvements in the design of conveyor chains but little attention has been given to improvement of the supporting structure for the chain, and the usual practice has been to provide, at the location of the conveyor, whatever supporting structure is required to receive the chain and to mount the motor means in any suitable manner for driving such chain. In most instances the personnel of the plant in which the chain is to operate build a suitable structure taking into consideration the interferences at the site and fabricating special fittings as are required to provide the conveyor supporting means. The final structure is usually a haphazard assortment of specially designed fabricated parts which cause the cost of the installation to run relatively high in most instances.

The main object of the present invention is the provision of a conveyor structure of unique design which lends itself to adaptation to use in almost any environment in which it is desired to install it and which supporting structure may be prefabricated so as to require a minimum of time and effort to erect it at the site within the plant in which the conveyor is to be run.

Another object of the invention is the provision of an elongated supporting member adapted to support a conveyor chain or like article carrying element and which member is of a design lending itself to use with any length of conveyor chain desired and also lending itself to installation in almost any location and adaptable to special situations which may exist.

Another object of the invention is the provision of a "knock-down" conveyor which may be shipped to the site in a knocked-down condition and which may be readily assembled in a minimum length of time by unskilled personnel.

Still another object of the invention is the provision of a unique conveyor driving unit which permits the motor means for actuating the conveyor chain to be located at a convenient distance from the driven end of the conveyor.

Yet another object of the invention is the provision of a unique conveyor mounting means of a design which eliminates susbtantially all accident hazards to personnel working on or about the conveyor.

Another object of the invention is the provision of a conveyor structure of flexible design which, in addition to being readily assembled, may also be readily disassembled and quickly adjusted to suit different sizes of articles which may be carried on the conveyor chain.

Other objects and advantages of the invention will be apparent from the following specification and from the drawings.

FIG. 1 is a fragmentary perspective of a conveyor structure constructed in accordance with the invention.

FIG. 2 is a cross section taken in a plane indicated by lines 2—2 of FIG. 1.

FIG. 3 is a cross section at the driven end of the conveyor taken in a plane indicated by lines 3—3 of FIG. 1.

FIG. 4 is a cross section at the power means taken in a plane indicated by lines 4—4 of FIG. 1.

FIG. 5 is an exploded perspective of the means for connecting aligned sections of the conveyor support.

In detail, and first with reference to FIG. 1, the invention will be described in connection with a somewhat oversimplified installation which comprises a straight length of conveyor chain adapted to support bottles or other articles for movement from one end to the other. It will be understood in this connection that the present invention contemplates that conventional turning devices may be employed and various types of chains may be used to effect turns for causing the articles to change direction. For the purpose of the present description only the simplest arrangement is disclosed.

In the simplified structure of FIG. 1 it is seen that the invention includes an elongated frame member generally designated 1 which is generally C-shaped in cross section and includes a top wall 2, a bottom wall 3 and a side wall 4 connecting the corresponding edges of the top wall 2 and bottom wall 3. Said member may conveniently be formed from steel plate having a thickness of about 1/8" and which thickness is suitable for substantially all types of installations. The side opposite the side wall 4 is open to provide ready access into the interior of the frame member 1. However, in order to enhance the stiffness of the frame member 1, and for other reasons which will become apparent later on, a relatively short depending flange 5 is integrally formed on top wall 2 and a similar upwardly extending narrow flange 6 is integrally formed on bottom wall 3. Despite the presence of flanges 5 and 6 it will be noted that the side of the member 1 opposite side wall 4 is susbtantially open along the entire length of member 1.

The top wall 2 is formed centrally of its width to provide an upwardly opening trough 10 which is adapted to receive therein the central portions of the conveyor elements. Although the particular design of the conveyor chain is not critical insofar as the instant invention is concerned, the form of chain illustrated includes a plurality of relatively flat conveyor elements 11 hingedly connected together by hinge pins 12 (FIG. 2) so that the hinge portion of the connection extends across only the central portion of the chain and thus may be received in the trough 10. The opposite outer portions 13, 14 of the chain elements (FIG. 2) are slidably supported on the portions of the top wall 2 that are laterally outwardly of the central trough 10. The bottom wall 3 may be flat as indicated so as to support the lower or return flight of the chain while the top wall 2 supports the upper working flight.

At the opposite ends of the frame member 1 there may be provided substantially identical sprocket wheel supports. In FIG. 1 the support for the driven end is indicated at 18 while the support for the idler end is indicated at 19. Only the driven end support 18 will be described in detail since support 19 is substantially identical thereto.

As best seen in FIG. 3, the support for the conveyor driving sprocket comprises a generally U-shaped member that includes opposed sides 20, 21 and a bottom 22. The upper margins of sides 20, 21 are turned inwardly to form flanges 24, 25. The corresponding ends of sides 20, 21 are formed to a radius (FIG. 1) and said ends are apertured to receive the sprocket shaft 26 (FIG. 3) therethrough. It will be apparent that the support 18 may readily be inserted longitudinally into the open end of the frame member 1 and adjustably moved therealong so as to develop the desired tension in the conveyor chain. When the support 18 is in its proper position it may be fixedly secured to the frame member 1 by means of preferably four bolts 28. To facilitate the securement the side 21 of the support 18 at the open side of the frame member 1 may be provided with suitable apertures for receiving the bolts 28 therethrough and, as best seen in FIG. 3, nuts 29 may be welded to the inner surface of side 21 for threaded engagement with said bolts 28.

The present invention lends itself to speedy and effective assembly of parts such as support 18 by means of generally rectangular clips 30 which, as best seen in FIGS. 3, 5, comprise a rectangular section of plate bent to provide a short flange 31 along one edge and which flange is of a depth substantially equal to the thickness of the plate material from which the frame member 1 and the support 18 are formed. Referring to FIG. 3, it is seen that the clips 30 may be interposed between the heads of bolts 28 and the flanges 5, 6 of frame member 1 so that when the bolts 28 are tightened the support 18 is fixedly secured in the desired position by a clamping action on flanges 5, 6. If it is desired to shift the support 18 it will be apparent that this may be done simply by unloosening the bolts 28. It should be noted that the bolts 28 need not be passed through the material of the frame member 1 in order to effect the above described securement.

At this point it is important to note that a member such as support 18 may be secured relative to the frame member 1 from the open side of the latter and it is not necessary that any operation be performed at the closed side 4 of the frame member 1. It will also be apparent later on that all assembly and disassembly operations may be carried out from the open side of the conveyor and access to or through the closed side of the conveyor structure is not required. This is an important consideration with respect to the speed with which the assembling and disassembling operations may be carried out and, furthermore, a safety feature obtains in that the closed side of the frame member is smooth and not encumbered by appendages which may be engaged by personnel working alongside.

The sprocket wheel 34 at the powered end of the conveyor may be driven by a chain 35 (FIG. 1) which in turn is driven by a preferably smaller sprocket wheel 36 (FIG. 4) supported on the output shaft 37 of a speed reducer 38 which in the particular example shown is driven by a belt 39 from an electric motor 40. The sprocket wheel 34 is fixedly secured to the conveyor driving wheel 33 (FIG. 3).

The drive mechanism may be conveniently supported on the frame member 1 by means of a bracket generally designated 42 (FIG. 4). The bracket 42 may be formed from a rectangular plate bent along a pair of parallel lines to provide an upper vertical portion 43, an intermediate horizontal portion 44 and a lower vertical portion 45. The motor 40 may be conveniently secured by bolts to the lower vertical portion 45 and the speed reducer 38 secured to the upper vertical portion 43. The bracket 42 is secured to the main frame member 1 by means of a pair of vertically extending longitudinally spaced flat bars 48 (FIG. 4) extending between the flanges 5, 6 of the member 1. Bolts 50 extending through upper vertical portion 43 of bracket 42 and the flat bars 48 may be provided with threaded apertures to fixedly secure the bracket 42 relative to the member 1. Alternatively, nuts may be welded to flat bars 48 if additional thread length is required.

It will be apparent that the above described structure for mounting the motor means permits shifting of the latter longitudinally of the frame member 1 to suit whatever tension in the chain 35 is desired. Furthermore, it will be apparent that the relatively bulky motor 40 may be positioned in an inner position relative to the frame member 1 and need not project an unreasonable amount outwardly therefrom.

Flat bars similar to the above described flat bars 48 together with clips such as clips 30 may be employed at spaced points along the length of the frame member 1 as required to prevent sagging of the top wall 2.

As stated above, the sprocket wheel support 19 at the idler end of the conveyor structure is substantially the same as support 18 described above except that no chain sprocket need be provided.

When the conveyor is employed to carry bottles or like articles it is necessary to provide guides above the conveyor for holding the bottles or other articles within an exact predetermined path of travel. Thus, as seen in FIG. 1, there are provided upper and lower guide rails or bars 56, 57, respectively, on one side of the conveyor and upper and lower guide bars 58, 59 on the opposite side of the conveyor. These guide bars may take the form of angle bars (FIG. 2) each provided along one flange with a U-shaped strip of nylon or the like indicated at 55. The guide bars 56, 57 are supported on a relatively large angle bar 60 and the opposite guide bars 58, 59 are supported on a similar angle bar 61. The vertical leg of each of said angle bars 60, 61 is provided with a pair of vertically elongated holes 62, 63, respectively, for receiving bolts 64 therethrough. The angle bar guides 56, 57 may be secured by means of clips 66, similar to clips 30, to the angles 60, 61 with the elongated holes 62, 63 permitting vertical adjustment of the guide strips to suit the particular articles being conveyed.

The horizontally extending legs of angles 60, 61 may be fixedly but releasably secured to a mounting bracket generally designated 68 (FIG. 2). Said mounting bracket 68 is generally U-shaped, being provided with opposed sides 69, 70 and a bottom portion 71 connecting said sides. It is preferable to form the bracket 68 of relatively heavy material compared to the weight of the material forming the main frame member 1 so as to permit adequate securement of said bracket and the guides secured thereto from the open side of the frame member only. To this end a flat bar 78 may be employed to secure the side 69 of bracket 68 to the main frame member 1 by bolts 75, 76. Again it will be noted that securement of this accessory is performed from one side only of the main frame.

The sides 69, 70 of the bracket 68 are each provided with horizontally outwardly extending extensions 79, 80 to which the horizontal legs of guide supporting angles 60, 61 may be adjustably secured by means of shallow channel-shaped clips 81 and bolts 82 (FIG. 1). It will be noted that the guide strips may be supported with as many brackets 68 as are necessary for the particular purpose and that the above described structure permits ready adjustment of the guides as required to suit the width of the path of travel of the particular articles being run.

From a production point of view it is, of course, desirable to construct the frame member 1 in standard lengths and, in the event the conveyor is a long one, to join two or more sections of the frame member 1 together to achieve the total length required. In FIG. 5 the structure for joining adjacent aligned sections 1 is shown. A generally U-shaped connector 83 of a shape very similar to the shape of supports 18, 19 is adapted to be telescopically received within the adjacent ends of the sections 1 of the main frame member and may be secured to said sections by bolts 84 and clips 30 in a manner analogous to the securement of supports 18, 19. Two or more suitable legs 86 may be positioned under the main frame 1 and secured thereto by strap 87, bolts 88 and flat bar 89.

It will be seen that the above described conveyor structure lends itself to inexpensive production and is adapted for speedy assembly at the site where the conveyor is to operate. Furthermore, the structure is readily disassembled in the event the conveyor is employed for a temporary use and the steps of assembling and disassembling may be performed by unskilled personnel.

The above described structure is extremely flexible in operation and lends itself to use with articles of various types and sizes. In this connection it should be noted from FIG. 2 that the use of the conveyor is not limited to articles having a lateral extent equal to or less than the width of the frame member. The conveyor may, for example, be used to carry bottles having a diameter considerably greater than the width of main frame member 1 since the guide rail supports 60, 61 may be moved apart a distance greater than the spacing shown in FIG. 2. In fact, because of the use of the channels 81 and bolts 82 it will be seen that only the extent of the horizontal extensions 79, 80 limit the size of articles that can be carried.

The above very specific description of the preferred form of the invention is not to be taken as restrictive thereof as it is apparent that various modifications in design may be resorted to by those skilled in the art without departing from the scope of the following claims.

I claim:

1. Conveyor structure comprising:
   an elongated article supporting element,
   an elongated frame member of substantially uniform cross section receiving said element thereon for movement of the latter longitudinally of said member,
   said member comprising a top wall, a bottom wall, and a side wall connecting said top wall and bottom wall along corresponding edges of said top wall and bottom wall, whereby the side of said member opposite said side wall opens outwardly of one side of said element,
   a wheel disposed adjacent one end of said member for receiving said article supporting element therearound,
   a supoprt for rotatably supporting said wheel,
   said support being received telescopically within said one end of said member,
   means for releasably securing said support to said member in one of a plurality of different positions relative to said member to permit varying the tension in said element.

2. Conveyor structure comprising:
   an elongated frame member of substantially uniform cross section receiving said element thereon for movement of the latter longitudinally of said member,
   said member comprising a top wall, a bottom wall, and a side wall connecting said top wall and bottom wall along corresponding edges of said top wall and bottom wall, whereby the side of said member opposite said side wall opens outwardly of one side of said element,
   a wheel disposed adjacent one end of said member for receiving said article supporting element therearound,
   motor means spaced longitudinally inwardly of said wheel from said one end,
   driving means connecting said motor means and said wheel for rotating the latter,
   said driving means being received within said member between said top and bottom walls.

3. Conveyor structure comprising:
   an elongated frame member of substantially uniform cross section receiving said element thereon for movement of the latter longitudinally of said member,
   said member comprising a top wall, a bottom wall, and a side wall connecting said top wall and bottom wall along corresponding edges of said top wall and bottom wall, whereby the side of said member opposite said side wall opens outwardly of one side of said element,
   a second similar frame member disposed in alignment with said first mentioned frame member,
   a connector telescopically received within the adjacent aligned ends of said members, and
   means for fixedly securing said connector to said members.

4. Conveyor structure comprising:
   an elongated frame member of substantially uniform cross section receiving said element thereon for movement of the latter longitudinally of said member,
   said member comprising a top wall, a bottom wall, and a side wall connecting said top wall and bottom wall along corresponding edges of said top wall and bottom wall, whereby the side of said member opposite said side wall opens outwardly of one side of said element,
   an article engaging guide rail disposed above said member and offset to one side of the vertical central plane of said member,
   a generally U-shaped bracket in partially encircling relationship to said member at a point along the length of the latter,
   said bracket including an integral extension extending horizontally outwardly of said bracket,
   a guide rail support connecting said guide rail to said extension, and
   means operatively connecting said guide rail support and said extension for removably securing said support to said extension for varying the distance between said rail and the vertical central plane of said member.

5. A structure according to claim 4 wherein means is provided for adjustably securing said rail in positions at different distances upwardly from said top wall.

6. A conveyor structure comprising:
   an elongated frame member of substantially uniform cross section adapted to receive a conveyor chain thereon for movement of said chain longitudinally of said member,
   said member being generally channel-shaped including a top wall, a bottom wall and a unitary side wall connecting said top wall and bottom wall along corresponding edges thereof, whereby the side of said member opposite said side wall opens outwardly of one side of said chain to provide access to the interior of said channel-shaped member,
   said wall and bottom wall being respectively provided with downwardly and upwardly extending narrow flanges projecting slightly into said open side,
   clamping means for clamping said flanges between a pair of elements to permit securement of an article by said elements to said frame member at said flanges.

7. A structure according to claim 6 wherein said clamping means comprises a clip having an offset portion equal in width to about the thickness of said flanges whereby said offset portion engages the article to be secured and the remainder of said clip has a portion engaging one of said flanges, and a screw threaded element for urging said clip and article toward each other.

8. A structure according to claim 6 wherein a generally U-shaped bracket in partially encircling relationship to said frame member is provided at a point along the length of the latter,
   said bracket including a pair of integral extensions extending horizontally outwardly thereof,
   guide rail supports secured to said extensions respectively,
   said guide rail supports being adapted to be secured to said extensions at points laterally outwardly of said frame member to permit carrying articles of a lateral extent greater than the width of said member.

References Cited by the Examiner

UNITED STATES PATENTS

| | | | |
|---|---|---|---|
| 2,718,296 | 9/1955 | Johnson | 198—204 |
| 2,747,725 | 5/1956 | Hatch | 198—204 |
| 3,065,843 | 11/1962 | Madison | 198—204 |

EVON C. BLUNK, *Primary Examiner.*

RICHARD E. AEGERTER, *Examiner.*